United States Patent
Kanaguchi et al.

(10) Patent No.: US 7,016,148 B2
(45) Date of Patent: Mar. 21, 2006

(54) MAGNETIC HEAD FOR ROTARY HEAD DRUM

(75) Inventors: Masahiro Kanaguchi, Kanagawa (JP); Jiro Fujiwara, Tokyo (JP); Hikaru Hirata, Kanagawa (JP)

(73) Assignee: Sony Corporation, Tokyo (JP)

(*) Notice: Subject to any disclaimer, the term of this patent is extended or adjusted under 35 U.S.C. 154(b) by 117 days.

(21) Appl. No.: 10/441,811

(22) Filed: May 20, 2003

(65) Prior Publication Data
US 2004/0021983 A1    Feb. 5, 2004

(30) Foreign Application Priority Data
May 21, 2002  (JP)  ............................. 2002-146703
May 21, 2002  (JP)  ............................. 2002-146704

(51) Int. Cl.
G11B 5/127    (2006.01)
G11B 5/187    (2006.01)
(52) U.S. Cl. ................................. 360/122; 360/130.24
(58) Field of Classification Search ................ 360/122, 360/130.24, 130.22, 130.23
See application file for complete search history.

(56) References Cited

U.S. PATENT DOCUMENTS

| | | | | |
|---|---|---|---|---|
| 3,872,507 A | * | 3/1975 | Sano et al. | 360/221 |
| 3,961,372 A | * | 6/1976 | Brock et al. | 360/130.24 |
| 6,590,741 B1 | * | 7/2003 | Hasegawa et al. | 360/122 |
| 6,822,820 B1 | * | 11/2004 | Winarski et al. | 360/69 |

FOREIGN PATENT DOCUMENTS

| | | | |
|---|---|---|---|
| JP | 56130818 A | * | 10/1981 |
| JP | 2001118220 A | * | 4/2001 |
| JP | 2002050014 A | * | 2/2002 |

* cited by examiner

Primary Examiner—William J Klimowicz
(74) Attorney, Agent, or Firm—Frommer Lawrence & Haug LLP; William S. Frommer

(57) ABSTRACT

A magnetic head for a rotary head drum is disclosed which can suppress abrasion thereof while a sufficient contact thereof with a magnetic tape is secured. An upper side tape sliding surface and a lower side tape sliding surface are formed on a tape sliding surface at an end of a head chip on the opposite upper and lower sides of a central tape sliding surface, which has a magnetic gap thereon, with a pair of upper and lower grooves left therebetween. The upper side tape sliding surface which is brought into contact with a magnetic tape earlier than the central tape sliding surface is formed with an increased thickness while the lower side tape sliding surface which is brought into contact with the magnetic tape later than the central tape sliding surface is formed with a decreased thickness.

3 Claims, 18 Drawing Sheets

F I G. 5
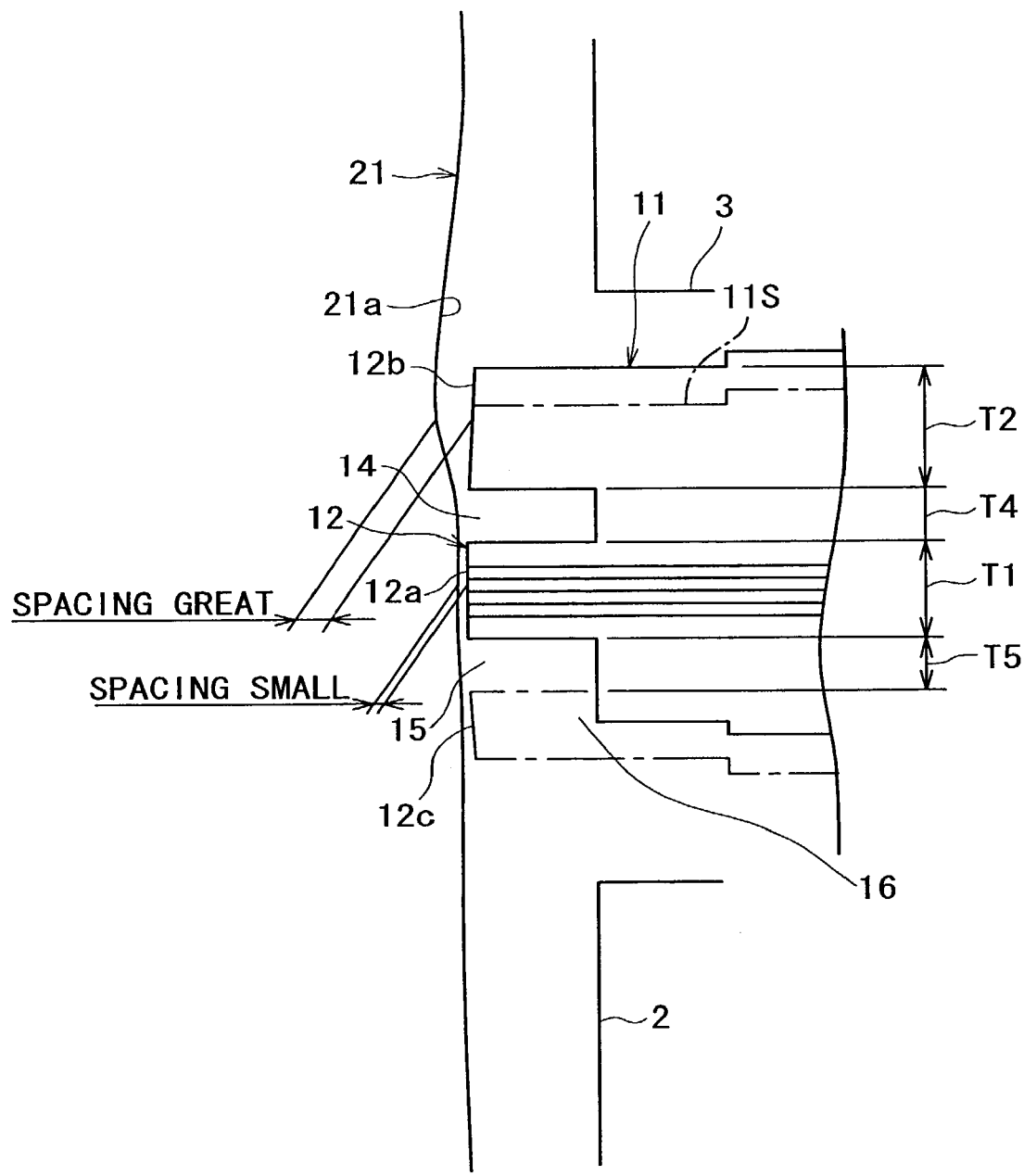

MAGNETIC HEAD FOR ROTARY HEAD DRUM

BACKGROUND OF THE INVENTION

This invention relates to a rotating magnetic head suitable for use with a rotary head drum of a high density magnetic recording and/or reproduction apparatus of the helical scanning type such as a video tape recorder (VTR) or a tape streamer, and more particularly to a technical field which relates to the shape of a head chip for a magnetic head.

Conventionally, in a plurality of rotating magnetic heads incorporated in a rotary head drum of a VTR, a tape stream or the like, a magnetic gap in the form of a slit having a width equal to the width of a signal recording track is formed at a substantially center of a tape sliding surface, which contacts with a magnetic tape, at an end of a head chip formed from a magnetic core.

The head chip helically scans the magnetic tape at a high speed to record or reproduce (write or read) a signal (data) onto or from the magnetic tape through magnetism conversion at the gap thereof.

FIGS. 12 and 13 show a rotary head drum 1 of a high density recording and reproduction apparatus of the helical scanning type of a conventional VTR, tape streamer or like apparatus. Referring to FIGS. 12 and 13, the rotary head drum 1 shown includes a plurality of rotating magnetic heads 6 including a plurality of recording heads 4 and a plurality of reproduction heads 5 mounted radially by means of screws 7 on and along an outer circumference of a lower end edge of a rotary drum 3 which is rotated above a fixed drum 2.

Each of the rotating magnetic heads 6 has a head chip 11 securely mounted at a radially outer end thereof. When the rotary drum 3 is rotated at a high speed in a direction indicated by an arrow mark b while a magnetic tape 21 is helically wrapped on an outer periphery of the rotary head drum 1 along a tape lead 8, which is a stepped portion formed helically on an outer circumference of the fixed drum 2, and is fed at a constant speed in a direction indicated by an arrow mark a, the magnetic tape 21 is helically scanned by the head chips 11 of the rotating magnetic heads 6 so that helical, high density recording or reproduction of signals (data) onto or from the magnetic tape 21 is performed.

Referring now to FIGS. 14, 15A and 15B, each of the head chips 11 has a tape sliding surface 12 and a magnetic gap 13 formed at a radially outer end thereof. The tape sliding surface 12 is formed in a substantially arcuate shape along two directions including the rotation direction b and a direction perpendicular to the rotation direction b, and the magnetic gap 13 is formed at a substantially central portion of the tape sliding surface 12 in the rotation direction b. A pair of upper and lower grooves 14 and 15 for permitting escapement of air therethrough are formed in parallel to the direction of the arrow mark b on the opposite upper and lower sides of the magnetic gap 13. The head chip 11 thus records (writes) or reproduces (reads) a signal at a high density onto or from a signal recording surface 21a of the magnetic tape 21 through electromagnetism conversion at the magnetic gap 13. In particular, upon signal recording, an electric signal is converted into magnetic fluxes, but upon reproduction, such a magnetic signal is converted into an electric signal.

More particularly, referring to FIG. 16, upon signal recording, the signal recording surface 21a of the magnetic tape 21 which is fed at a constant speed in a direction of an arrow mark a is helically scanned at a high speed in a direction of an arrow mark b from a lower edge 21b toward an upper edge 21c of the magnetic tape 21 by the head chips 11 of the plurality of recording heads 4 to successively record belt-like signal tracks (belt-like signal recording patterns) TR1, TR2, TR3, TR4, . . . , TRn at a fixed track pitch P onto the signal recording surface 21a of the magnetic tape 21 by means of the magnetic gaps 13 of the head chips 11. On the other hand, upon signal reproduction, the signal tracks TR1, TR2, TR3, TR4, . . . , TRn of the magnetic tape 21 are helically scanned in the direction of the arrow mark b successively by the head chips 11 of the plurality of reproduction heads 5 similarly as upon recording to successively reproduce the signal tracks TR1, TR2, TR3, TR4, . . . , TRn.

In order to achieve higher density recording for allowing recording and reproduction for a longer period of time while decreasing the consumed amount of magnetic tapes in the magnet recording and reproduction apparatus of the helical scanning type which uses a magnetic tape as described above, two countermeasures are available including a countermeasure of decreasing the track width of the signal tracks TR to be recorded onto the magnetic tape 21 and another countermeasure of decreasing the wavelength of a signal to be recorded. However, whichever one of the countermeasures is adopted, a drop of the head output cannot be avoided.

On the other hand, it seems a possible idea to decrease the depth of the magnetic gap 13 of the rotating magnetic head 6 to increase the head output. However, if the depth of the magnetic gap 13 is decreased, then even if the abrasion amount of the head per unit time is equal, the magnetic gap 13 opens in shorter time. Consequently, replacement of the rotating magnetic head 6 after a shorter interval of time is required, and a rise of the maintenance cost cannot be avoided.

In order to reduce the abrasion of the head, it seems a possible idea to increase the head contacting width over which the tape sliding surface 12 of each of the head chips 11 of the rotating magnetic head 6 contacts with the magnetic tape 21 to decrease the contacting pressure of the magnetic tape 21 with the tape sliding surface 12. It is to be noted that increase of the head contacting width decreases the abrasion of the magnetic gap 13.

Incidentally, the most significant factor of the head abrasion is a great number of very small magnetic particles of approximately several tens nm and so forth which naturally stick to the signal recording surface 21a of the magnetic tape 21 in a manufacturing process of the magnetic tape 21, and when the head chip 11 of the rotating magnetic head 6 helically scans the signal recording surface 21a of the magnetic tape 21, the tape sliding surface 12 of the head chip 11 is abraded by grinding force of the very small magnetic particles and so forth.

Particularly, when a fresh portion of the signal recording surface 21a of a new magnetic tape 21 on which no signal track TR is written as yet is helically scanned for the first time by a head chip 11, the head abrasion amount by the grinding force of the very small magnetic particles and so forth is naturally greater than that when an old portion of the signal recording surface 21a on which signal tracks TR are written already is helically scanned.

The reason why the head abrasion amount can be reduced by increasing the head contacting width of a head chip 11 is described with reference to FIGS. 15A, 15B and 17.

FIG. 15A shows a head chip 11S which is a conventional popular head chip wherein the head contacting width W1 of the tape sliding surface 12 is small while FIG. 15B shows a head chip 11L wherein the head contacting width W2 of the tape sliding surface 12 is increased uniformly in upward and downward directions.

FIG. 17A illustrates a manner wherein the "head 1", "head 2", "head 3" and "head 4" each including the head chip 11S having the tape sliding surface 12 of the small head contacting width W1 successively helically scan the signal recording surface 21a of the magnetic tape 21, which is fed at a constant speed in the direction of the arrow mark a, in order at a high speed in the direction of the arrow mark b at a fixed track pitch P.

Meanwhile, FIG. 17B illustrates a manner wherein the "head 1", "head 2", "head 3" and "head 4" each including the head chip 11L having the tape sliding surface 12 of the great head contacting width W2 successively helically scan the signal recording surface 21a of the magnetic tape 21, which is fed at a constant speed in the direction of the arrow mark a, in order at a high speed in the direction of the arrow mark b at a fixed track pitch P.

Since, in order to increase the recording density, it is necessary to decrease the width W3 of the magnetic gaps 13 of the head chips 11S and 11L which corresponds to the track width of the signal tracks TR to be recorded onto the magnetic tape 21, the head contacting width W1 or W2 is inevitably greater than the width W3 of the magnetic gap 13.

Accordingly, whichever one of the head chips 11S and 11L is used, when the tape sliding surfaces 12 of the "head 1", "head 2", "head 3" and "head 4" successively helically run (slidably move) on the signal recording surface 21a of the magnetic tape 21 in order at a fixed track pitch P, a lower side portion of a run portion (running locus) of the signal recording surface 21a along which the tape sliding surface 12 of each head runs with the head contacting width W1 or W2 overlaps with an upper side portion of a run portion (running locus) of the signal recording surface 21a along which the tape sliding surface 12 of a preceding head runs with the head contacting width W1 or W2.

In FIG. 17A, an overlap portion of a run portion by a succeeding head with a run portion by a preceding head among the "head 1", "head 2", "head 3" and "head 4" which each includes the head chip 11S of the small head contacting width W1 is indicated as "twice run portion".

In particular, in the case described above, a lower side portion of a run portion by a succeeding head overlaps, only once at a portion indicated as "twice run portion", with an upper side portion of a run portion of a preceding head and besides over a comparatively small overlap width. Accordingly, in each "once run portion" which does not overlap with another run portion and has a comparatively great width, a head runs on a normally new portion of the signal recording surface 21a of the magnetic tape 21 on which no preceding head has run (slidably moved). Also the magnetic gap 13 of a succeeding head always runs on a new portion of the signal recording surface 21a of the magnetic tape 21 on which no preceding head has run (slidably moved).

Meanwhile, in FIG. 17B, overlap portions of a run portion by succeeding heads with a run portion by a preceding head among the "head 1", "head 2", "head 3" and "head 4" which each includes the head chip 11L of the great head contacting width W2 are indicated as "twice run portion" and "three-time run portion".

In particular, in the case just described, a lower side portion of a run portion by a succeeding head overlaps, twice at portions indicated as "twice run portion" and "three-time run portion", with upper side portions of run portions by two preceding heads. Thus, in each comparatively great width run portion w1 indicated as "run portion W1 preceding to head gap", the magnetic gap 13 can run on an old portion of the signal recording surface 21a of the magnetic tape 21 on which a preceding head or heads have run (slidably moved).

From the foregoing, it can be recognized that the abrasion amounts at the tape sliding surface 12 and the magnetic gap 13 of the head chip 11 by grinding force of very small magnetic particles and so forth sticking to the signal recording surface 21a of the magnetic tape 21 described hereinabove can be reduced with the head chip 11L which has the greater head contacting width W2 when compared with the head chip 11S which has the smaller head contacting width W1.

However, if the head contacting width W2 of the tape sliding surface 12 of the head chip 11 is merely increased as seen in FIG. 15B, then since the amount of air drawn in between the tape sliding surface 12 and the magnetic tape 21 increases, the spacing or distance between the head chip 11 and the magnetic tape 21 increases, resulting in decrease of the head output.

Therefore, it is demanded to decrease the abrasion of the head chip 11 by grinding force of very small magnetic particles and so forth while sufficient contact between the head and the tape is secured.

Therefore, in order to secure sufficient contact between the head and the tape, it has been conventionally proposed to form, as described hereinabove with reference to FIGS. 14, 15A and 15B, a pair of upper and lower grooves 14 and 15 on the opposite upper and lower sides of the magnetic gap 13 in an upwardly and downwardly symmetrical relationship on the tape sliding surface 12 such that they extend in parallel to the direction of rotation of the head so that, upon helical scanning of the magnetic tape 21 by the head chip 11, the magnetic tape 21 may be attracted to the tape sliding surface 12 of the head chip 11 by a negative pressure effect by an air escaping action in the pair of upper and lower grooves 14 and 15, as disclosed in Japanese Patent Laid-Open Nos. Hei 1-151019, Hei 1-235012, Hei 2-240806 and Hei 11-316904.

However, even if the countermeasure described is adopted, if the head contacting width of the tape sliding surface 12 of the head chip 11 is increased in an upwardly and downwardly symmetrical relationship as seen in FIG. 15B, then this likewise gives rise to a problem that the spacing between the head chip 11 and the magnetic tape 21 increases. Therefore, the countermeasure still has a limitation to increase of the head contacting width while securing the head output.

On the other hand, in order to reduce the head abrasion, another countermeasure has been proposed wherein a plurality of dummy heads are disposed at preceding positions to the plurality of rotating magnetic heads 6 of the rotary head drum 1 such that the dummy heads grind very small magnetic particles and so forth sticking to the signal recording surface 21a of the magnetic tape 21 earlier than the rotating magnetic heads 6 while the rotating magnetic heads 6 helically scan the signal recording surface 21a of the magnetic tape 21.

Where the dummy heads are used in this manner, since the head grinding force by very small magnetic particles and so forth on the magnetic tape 21 decreases in proportion to the number of times by which a head runs on the magnetic tape 21 as seen from a graph of FIG. 18, the life of the head can be increased.

However, where a plurality of dummy heads are mounted on the rotary head drum 1 in this manner, this gives rise to another problem that a rise in cost cannot be avoided, and besides, also the maintenance cost increases because it is necessary to replace the dummy heads when they are abraded.

Further, since a pair of grooves on a head chip are formed in parallel to the direction of rotation of the head chip, if foreign substances such as magnetic particles sticking to the surface of the magnetic tape are transferred and stick now between the pair of grooves on the tape sliding surface of the head chip on the leading side in the direction of rotation of the head chip with respect to the magnetic gap, then the foreign substances such as the magnetic particles are carried, as the head chip rotates, in a direction parallel to the direction of rotation of the head chip on the tape sliding surface until they come to and are accumulated in the magnetic gap thereby to frequently cause clogging of the magnetic gap.

Accordingly, only if a pair of grooves are formed on the opposite sides of the magnetic gap on the tape sliding surface of the head chip such that they extend in parallel to the direction of rotation of the head chip, it is not easy to solve the problem of the spacing loss by clogging of the magnetic gap.

SUMMARY OF THE INVENTION

It is an object of the present invention to provide a magnetic head for a rotary head drum which can secure satisfactory contacting with a magnetic tape and suppress abrasion thereof even if a dummy head is not disposed on the rotary head drum and besides can eliminate the spacing loss by clogging of the magnetic gap.

In order to attain the object described above, according to an aspect of the present invention, there is provided a magnetic head for a rotary head drum, comprising a head chip having a tape sliding surface at an end thereof and having a magnetic gap formed on the tape sliding surface, the tape sliding surface having a pair of grooves formed along the opposite sides of the magnetic gap in such a manner that the tape sliding surface is divided into three tape sliding surfaces including a belt-like central tape sliding surface on which the magnetic gap is formed and a belt-like upper side tape sliding surface and a belt-like lower side tape sliding surface formed on the opposite upper and lower sides of the central tape sliding surface with the pair of grooves left therebetween, a first one of the upper side tape sliding surface and the lower side tape sliding surface which is brought into contact with a magnetic tape earlier than the central tape sliding surface being formed with an increased thickness, a second one of the upper side tape sliding surface and the lower side tape sliding surface which is brought into contact with the magnetic tape later than the central tape sliding surface being formed with a decreased thickness.

With the magnetic head for a rotary head drum, from between the upper side tape sliding surface and the lower side tape sliding surface formed on the tape sliding surface at the end of the head chip on the opposite upper and lower sides of the central tape sliding surface, which has the magnetic gap thereon, with the pair of upper and lower grooves left therebetween, the first tape sliding surface which is brought into contact with a magnetic tape earlier than the central tape sliding surface is formed with an increased thickness while the second tape sliding surface which is brought into contact with the magnetic tape later than the central tape sliding surface is formed with a decreased thickness. Consequently, while sufficient contact between the magnetic tape and the central tape sliding surface which has the magnetic gap thereon is secured, very small magnetic particles and so forth sticking to the magnetic tape can be ground over a great width by the first tape sliding surface which is brought into contact with the magnetic tape earlier than the central tape sliding surface of the preceding head.

According to another aspect of the present invention, there is provided a magnetic head for a rotary head drum, comprising a head chip having a tape sliding surface at an end thereof and having a magnetic gap formed on the tape sliding surface, the tape sliding surface having a pair of grooves formed along the opposite sides of the magnetic gap in such a manner that the tape sliding surface is divided into three tape sliding surfaces including a belt-like central tape sliding surface on which the magnetic gap is formed and a belt-like upper side tape sliding surface and a belt-like lower side tape sliding surface formed on the opposite upper and lower sides of the central tape sliding surface with the pair of grooves left therebetween, the pair of grooves being inclined with respect to a direction of rotation of the head chip.

With the magnetic head for a rotary head drum, the grooves formed along the opposite sides of the magnetic gap on the tape sliding surface at the end of the head chip are inclined with respect to the rotation direction of the head chip. Therefore, when the head chip is rotated to record or reproduce a signal onto or from the magnetic tape, foreign substances such as magnetic particles transferred from the magnetic tape to the tape sliding surface of the head chip on the leading side in the rotation direction of the head chip are admitted from the tape sliding surface into the grooves intermediately while they are carried toward the magnetic gap side as the head chip rotates.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a schematic side elevational sectional view of a head chip of a further rotating magnetic head for a rotary head drum to which the present invention is applied;

FIG. 13 is a bottom plan view of a rotary drum of the rotary head drum of FIG. 12 and a perspective view of a head chip of the rotary head drum;

DESCRIPTION OF THE PREFERRED EMBODIMENTS

Figure 1:
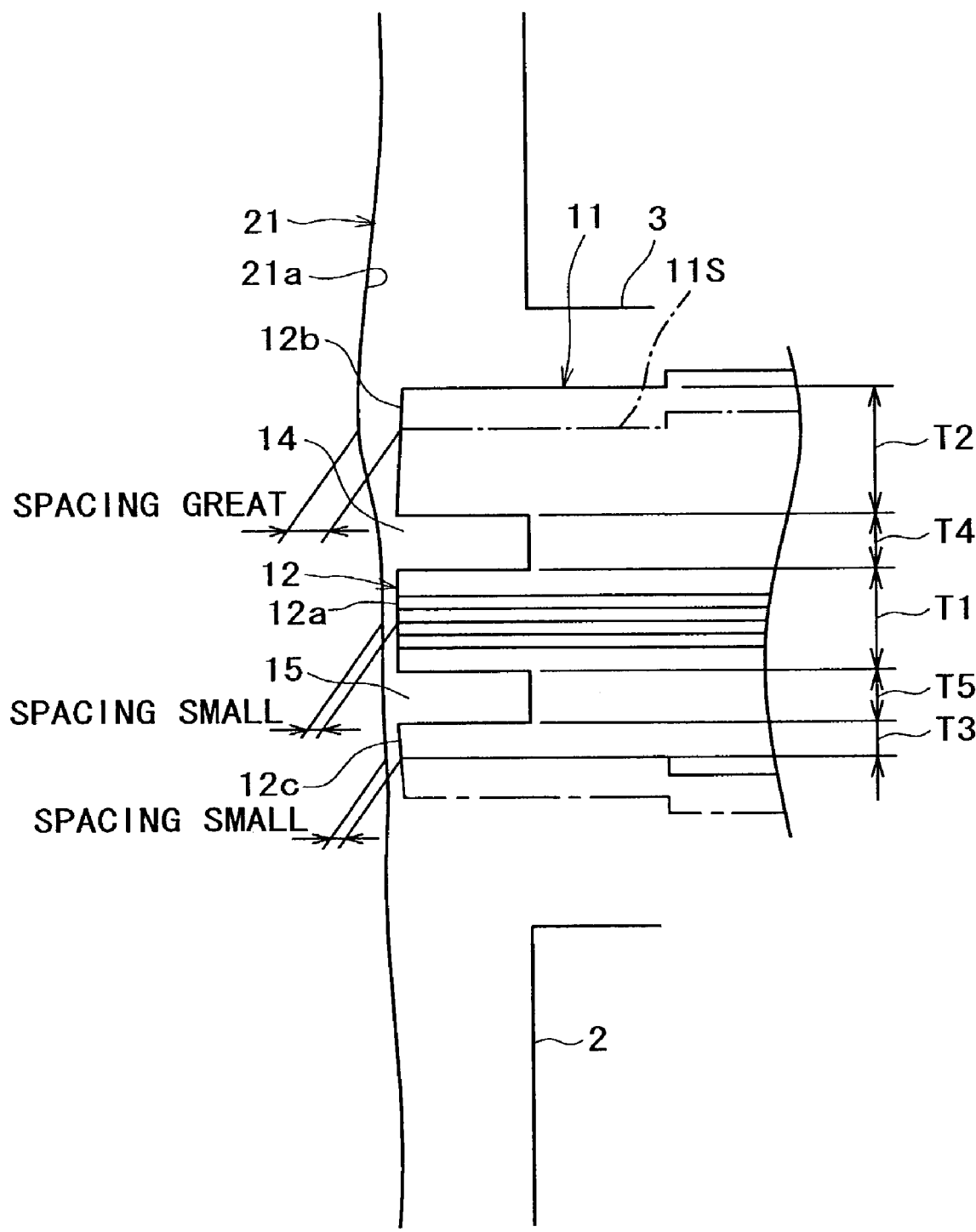
FIG. 1 is a schematic side elevational sectional view of a head chip of a rotating magnetic head for a rotary head drum to which the present invention is applied.

Several magnetic heads for a rotary head drum to which the present invention are applied are described below with reference to FIGS. 1 to 11. It is to be noted that, in FIGS. 1 to 11, like elements are denoted by like reference characters to those of FIGS. 12 to 18, and overlapping description of them is omitted herein to avoid redundancy.

First, a rotating magnetic head for a rotary head drum to which the present invention is applied is described with reference to FIGS. 1 to 3.

A head chip 11 of the rotating magnetic head 6 shown has a tape sliding surface 12 provided at a radially outer end thereof as described hereinabove. The tape sliding surface 12 is divided into three tape sliding surfaces including a belt-shaped central tape sliding surface 12a and belt-shaped upper side tape sliding surface 12b and lower side tape sliding surface 12c formed in parallel to the central tape sliding surface 12a on the opposite upper and lower sides of the central tape sliding surface 12a with a pair of upper and lower grooves 14 and 15 left therebetween, respectively. A magnetic gap 13 is formed at a substantially center of the central tape sliding surface 12a.

Figure 16:
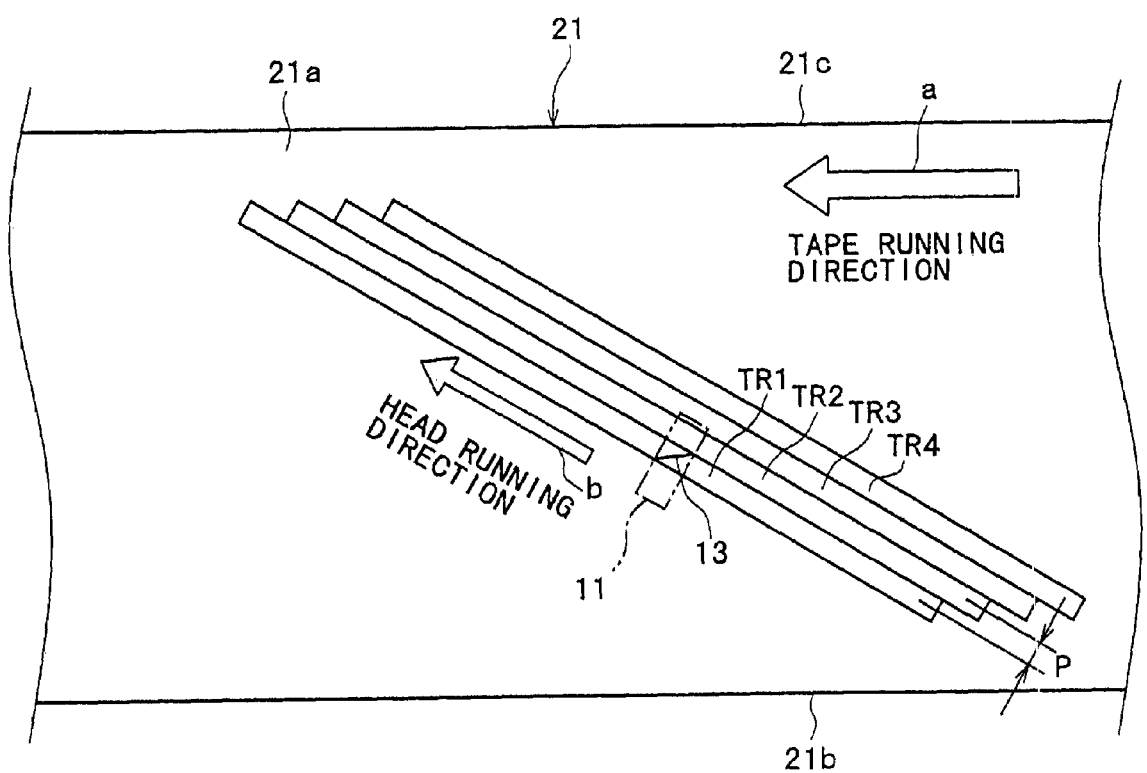
FIG. 16 is a schematic view illustrating helical scanning of a magnetic tape by head chips.

As described hereinabove with reference to FIG. 16, in a system wherein the rotating magnetic head 6 helically scans a magnetic tape 21, which is fed at a constant speed in a direction indicated by an arrow mark a, in a direction indicated by an arrow mark b from a lower edge 21b side toward an upper edge 21c side of the magnetic tape 21, the upper side tape sliding surface 12b serves as a preceding tape contacting surface which contacts with the magnetic tape 21 normally earlier than the central tape sliding surface 12a in which the magnetic gap 13 is formed while the lower side tape sliding surface 12c serves as a tape sliding surface which contacts with the magnetic tape 21 normally later than the central tape sliding surface 12a. Incidentally, the upper side tape sliding surface 12b corresponds to a first tape sliding surface defined in the accompanying claims while the lower side tape sliding surface 12c corresponds to a second tape sliding surface defined in the accompanying claims.

Thus, in the present first embodiment, where the thickness (vertical dimension in FIG. 1) of the central tape sliding surface 12a is represented by T1 while the thickness of the upper side tape sliding surface 12b which contacts with the magnetic tape 21 earlier than the central tape sliding surface 12a is represented by T2 and the thickness of the lower side tape sliding surface 12c which contacts with the magnetic tape 21 later than the central tape sliding surface 12a is represented by T3, the tape sliding surface 12 is formed so as to satisfy a relationship in thickness of T2>T1≧T3. It is to be noted that, where the thickness of the upper side groove 14 is represented by T4 and the thickness of the lower side groove 15 is represented by T5, the tape sliding surface 12 is formed so as to satisfy a relationship in thickness of T4=T5.

It is to be noted that the dimensions may be, for example, T1=approximately 73 $\mu$m, T2=approximately 150 to 200 $\mu$m, T3=approximately 54 $\mu$m, T4=approximately 150 $\mu$m and T5=approximately 150 $\mu$m.

With the head chip 11 of the rotating magnetic head 6 of the first embodiment having such a configuration as described above, when the "head 1", "head 2", "head 3" and "head 4" each including the head chip 11 having the tape sliding surface 12 successively helically scan the signal recording surface 21a of the magnetic tape 21, which is fed at a constant speed in the direction of the arrow mark a, in order at a high speed in the direction of the arrow mark b at a fixed track pitch P, an upper side portion of a run portion of the signal recording surface 21a by a preceding head is overlapped twice as indicated by "twice run portion" and "three-time run portion" by a succeeding head and a next succeeding head.

Figure 15A:
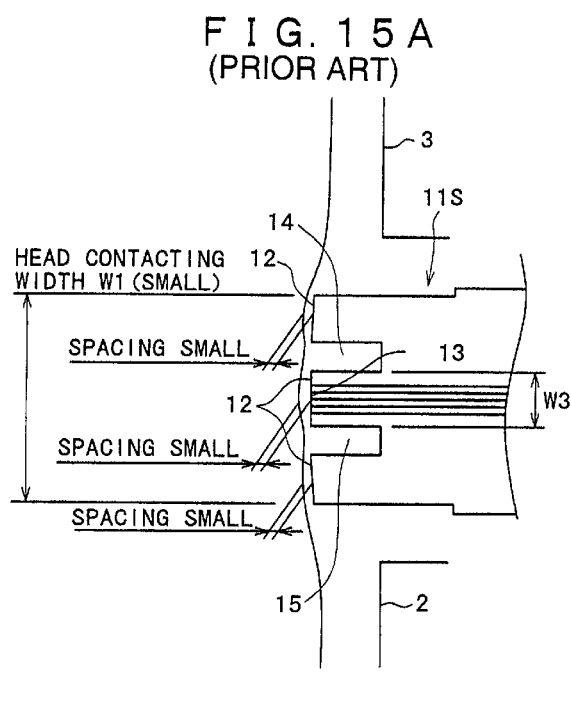
FIGS. 15A and 15B are side elevational sectional views illustrating a difference of the spacing between a magnetic tape and a magnetic head between a head chip having a small head contacting width and another head chip having an increased head contacting width.
Figure 15B:
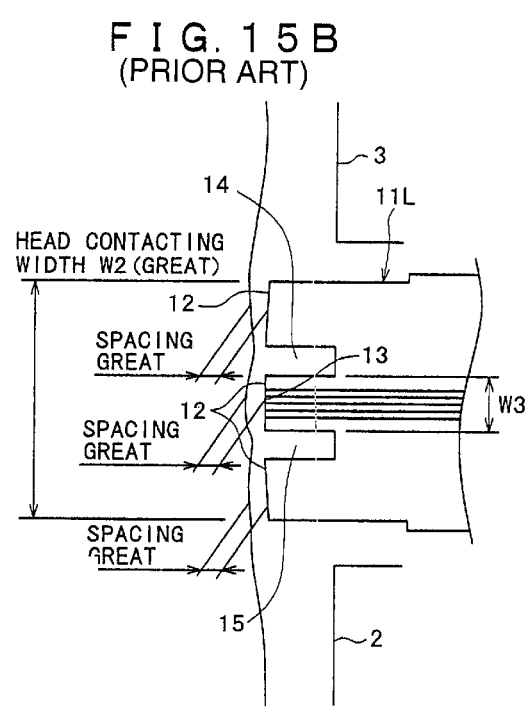
Figure 17A:
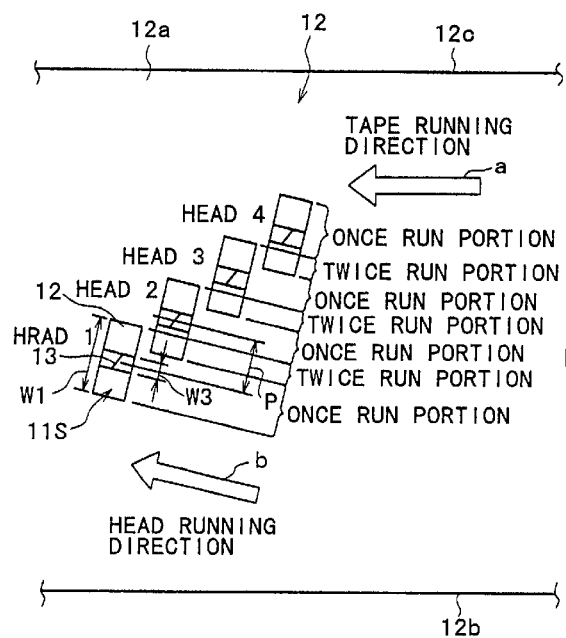
FIGS. 17A and 17B are schematic views illustrating a difference of the running condition on a magnetic tape between a head chip having a small head contacting width and another head chip having a great head contacting width.
Figure 17B:
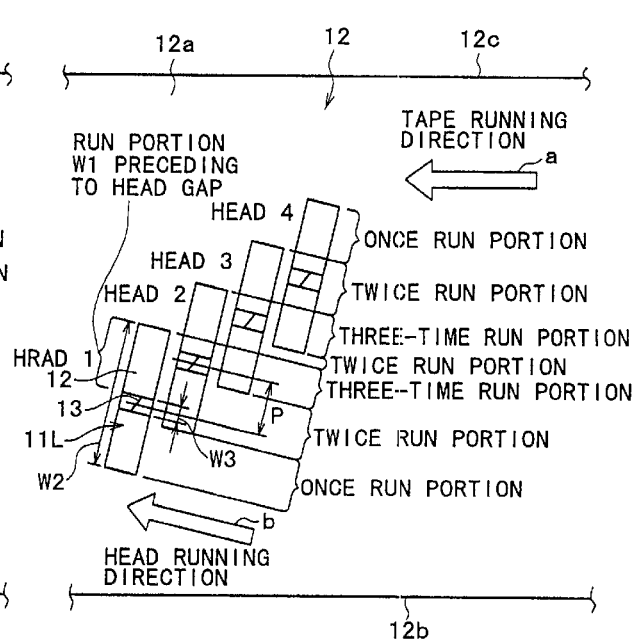
Figure 18:
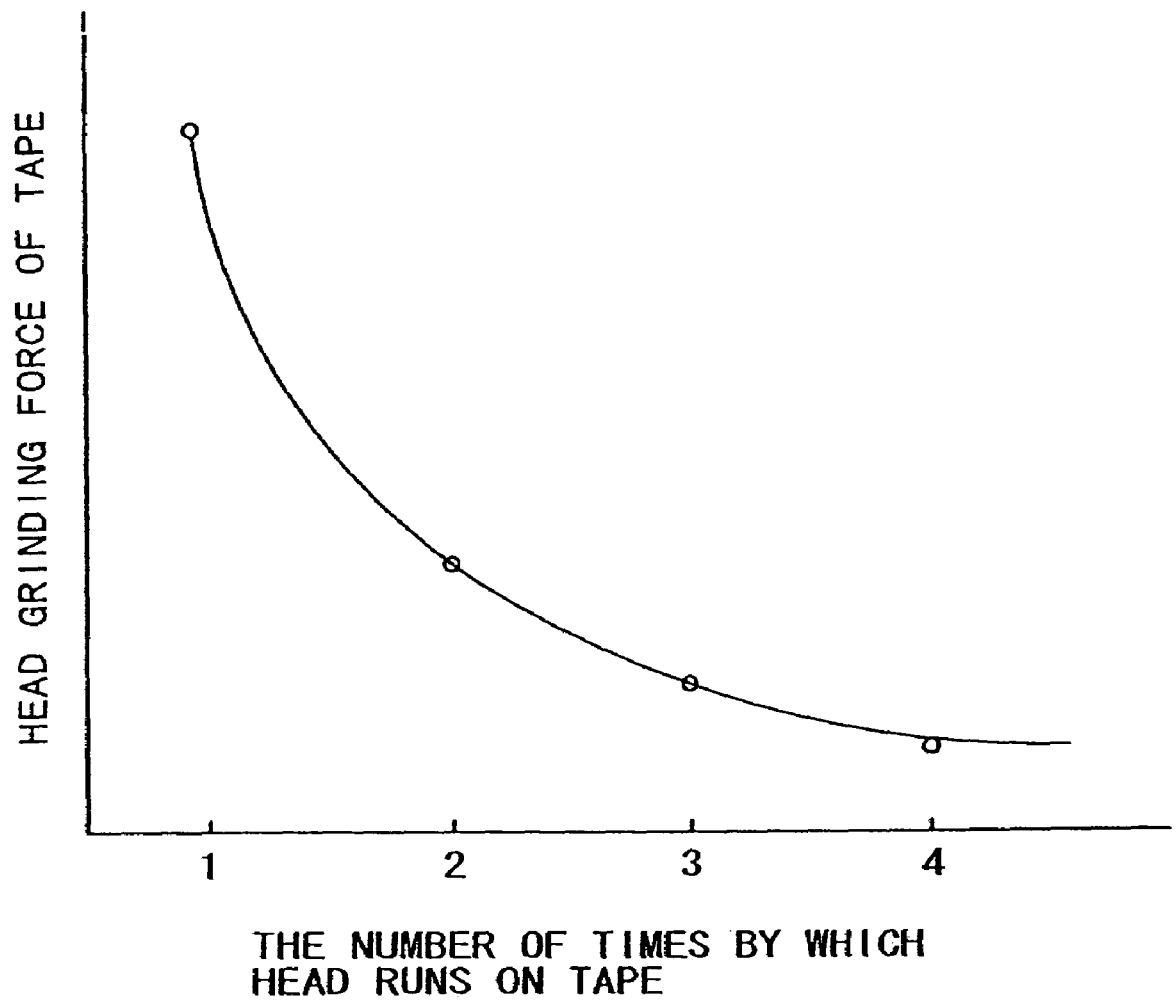
FIG. 18 is a graph illustrating a decrease of the head grinding force of a magnetic tape as the number of times by which a head runs on the magnetic tape increases.

In particular, similarly to the case wherein such a head chip 11L having a head contacting width W2 increased uniformly on the upper and lower sides as described hereinabove with reference to FIGS. 15B and 17B is employed, an upper side portion of a run portion (running locus) of the signal recording surface 21a by a preceding head is run over (slidably moved) successively (repetitively by a plural number of times) by lower side portions of two succeeding heads.

Figure 3:
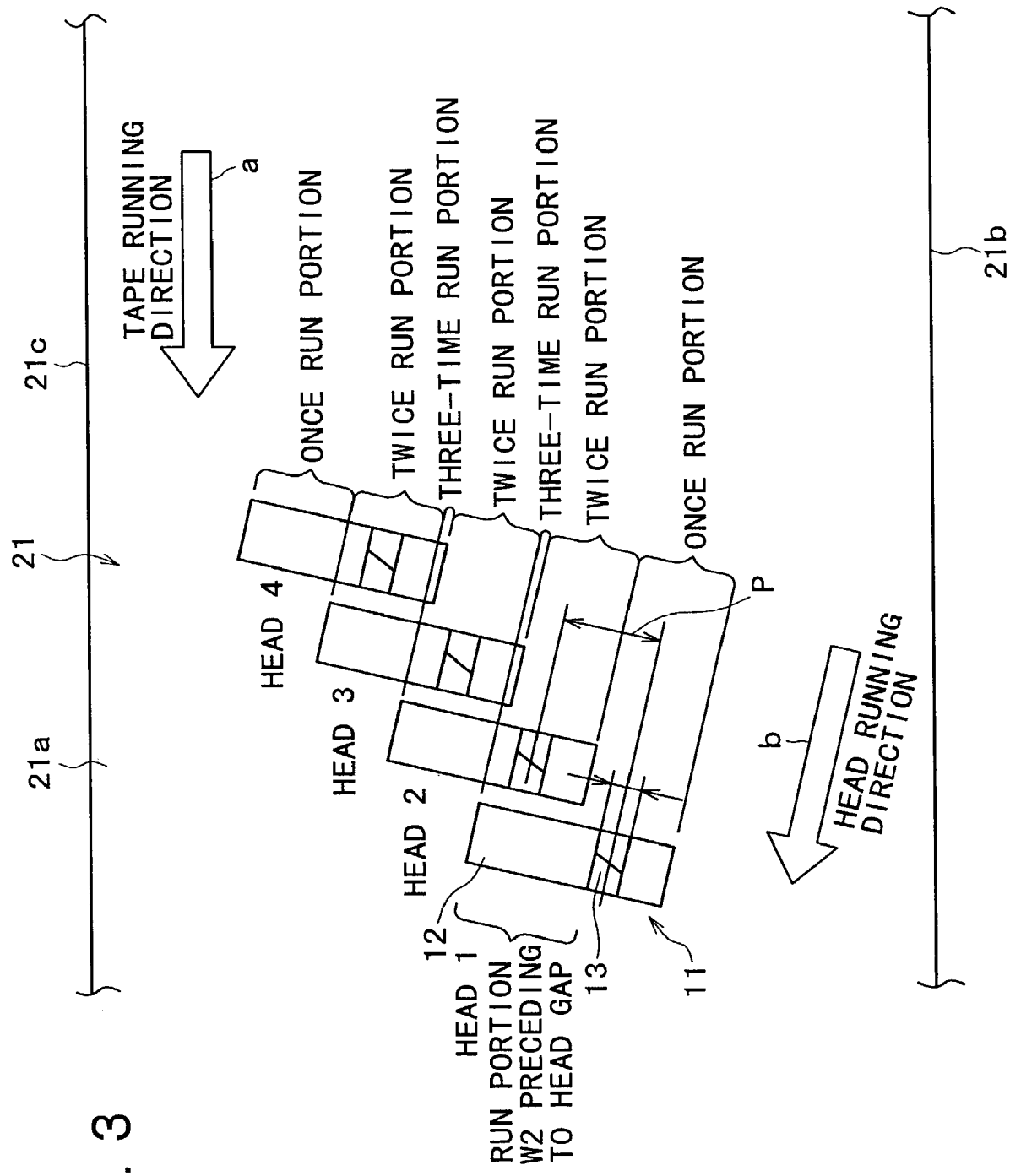
FIG. 3 is a schematic view illustrating a running situation of the head chip of FIG. 1 on a magnetic tape.

Besides, as seen in FIG. 3, the magnetic gap 13 of a succeeding head to a preceding head can run over an old portion of a comparatively great width of the signal recording surface 21a of the magnetic tape 21 as represented by "run portion W2 preceding to head gap" which has been run over (slidably moved) by the preceding head.

Accordingly, an effect (function) similar to that of a dummy head can be provided to the upper side tape sliding surface 12b having a comparatively great thickness T2 in that the head abrasion which is abrasion of the tape sliding surface 12 and the magnetic gap 13 of the head chip 11 by grinding force of very small magnetic particles and so forth sticking to the signal recording surface 21a of the magnetic tape 21 can be suppressed and increase of the life of the head chip 11 can be anticipated.

Figure 2:
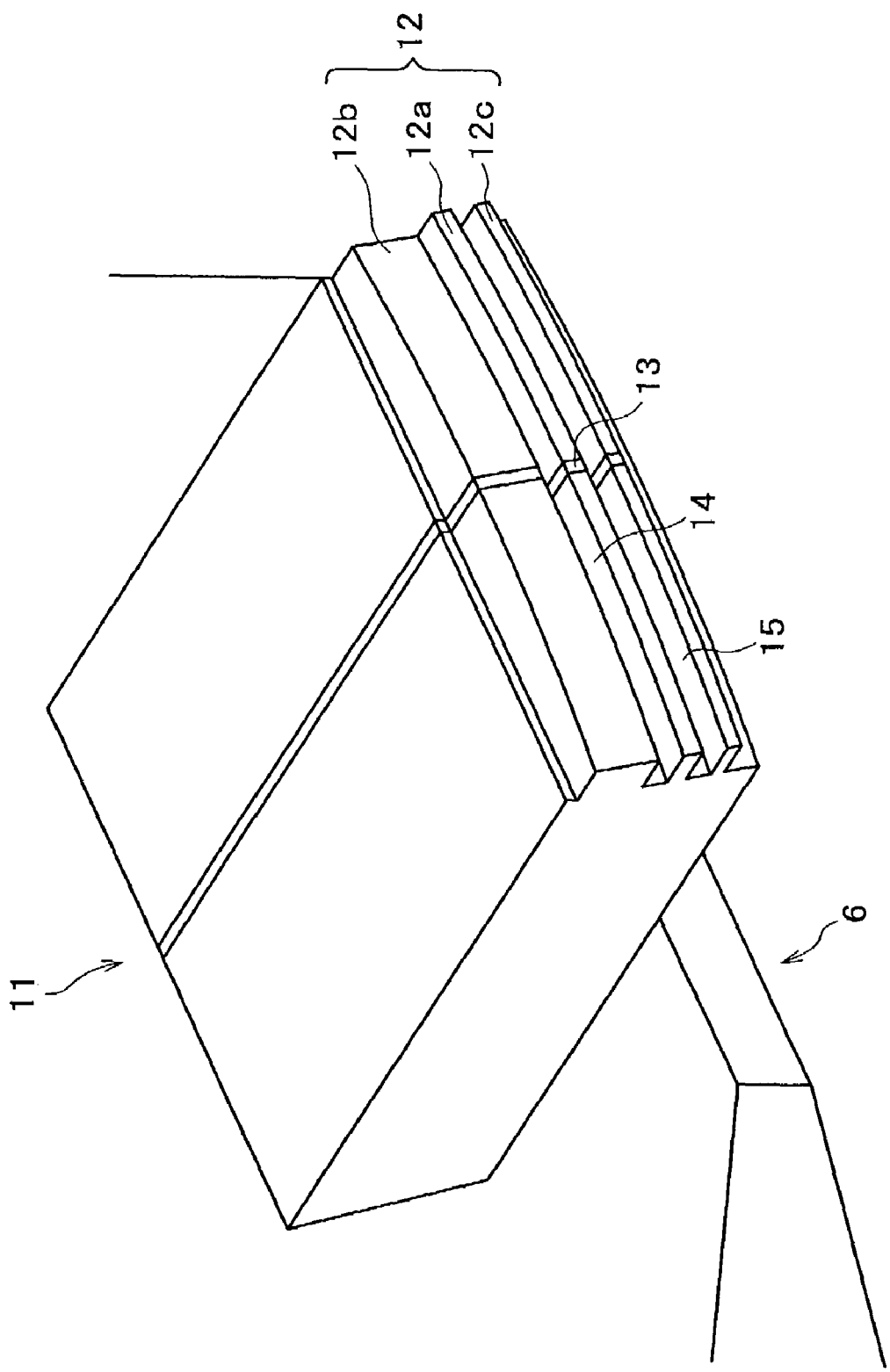
FIG. 2 is a perspective view of the head chip of FIG. 1.

Further, since the tape sliding surface 12 of the head chip 11 is formed such that the lower side tape sliding surface 12c has a decreased thickness T3 while the upper side tape sliding surface 12b has an increased thickness T2 as seen in FIG. 1, the amount of air which may be admitted between the lower side tape sliding surface 12c of the decreased thickness T3 and the magnetic tape 21 can be reduced to significantly reduce the spacing between the lower side tape sliding surface 12c and the magnetic tape 21, and consequently, a sufficiently high head output can be secured.

Figure 4:
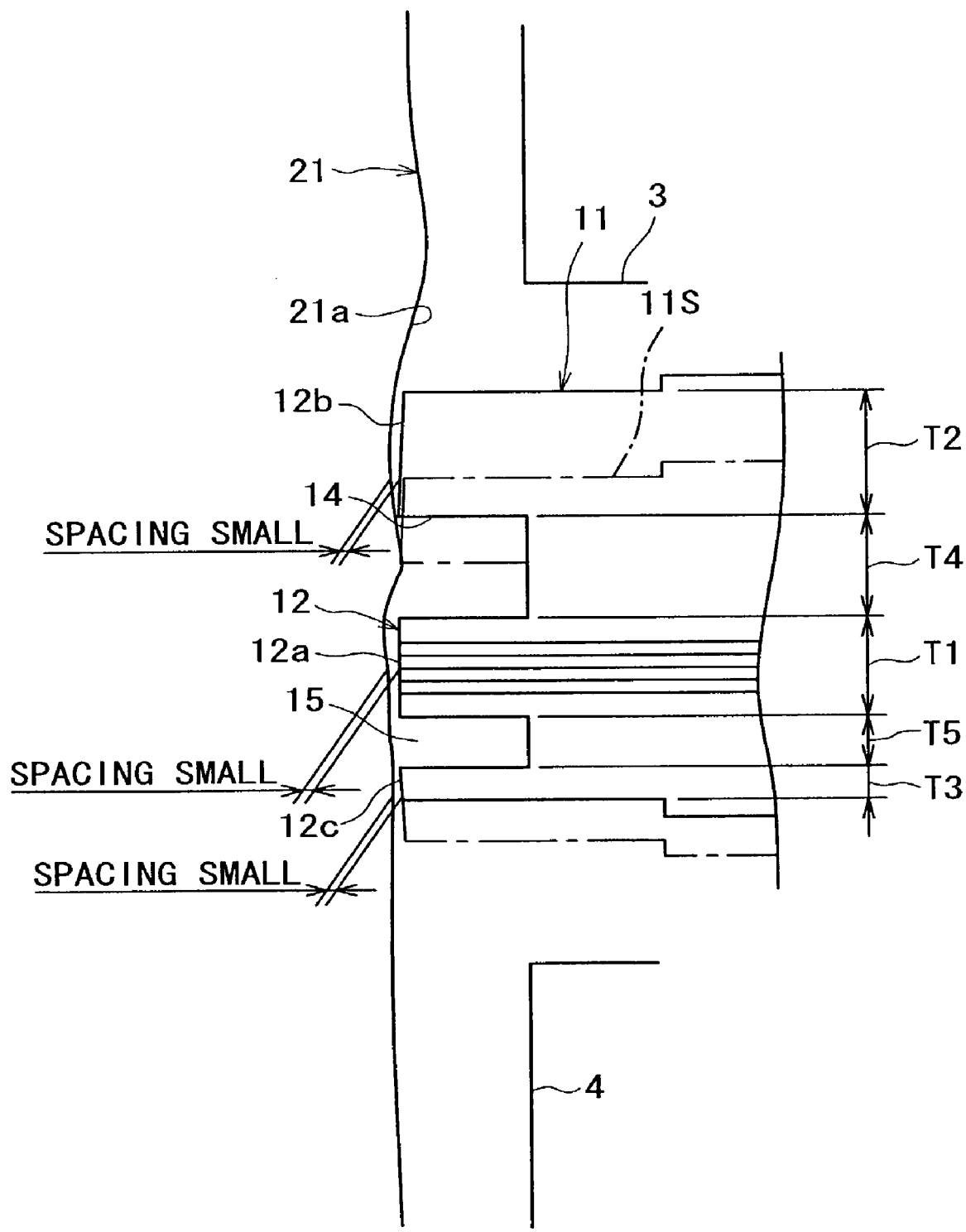
FIG. 4 is a schematic side elevational sectional view of a head chip of another rotating magnetic head for a rotary head drum to which the present invention is applied.

Referring now to FIG. 4, there is shown another magnetic head for a rotary head drum to which the present invention is applied.

In the present embodiment, the magnetic head is configured such that, in addition to the condition in thickness T2>T1≧T3, another condition in thickness of T4>T5 is satisfied and the thickness T4 is set to T4=approximately 160 to 200 µm.

Where the thickness T4 of the upper side groove 14 positioned just below the upper side tape sliding surface 12b having the comparatively great thickness T2 is increased in this manner, air escaping through the upper side groove 14 increases its negative pressure effect of attracting the magnetic tape 21 to the upper side tape sliding surface 12b. Consequently, the spacing between the entire tape sliding surface 12 and the magnetic tape 21 can be further reduced, and a sufficiently high head output can be secured further readily.

Figure 6:
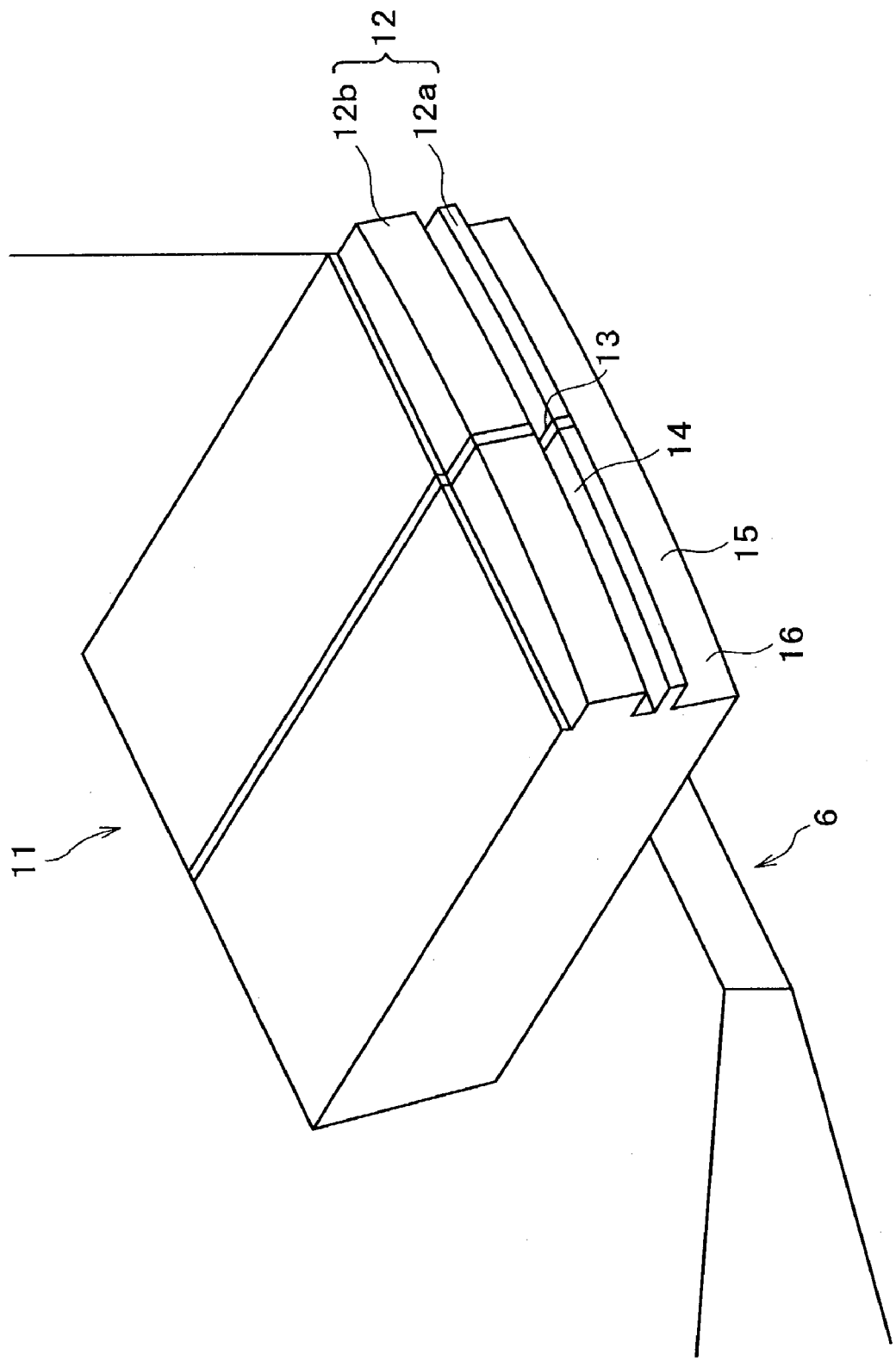
FIG. 6 is a perspective view of a head chip of the magnetic head of FIG. 5.

Referring now to FIGS. 5 and 6, there is shown a further magnetic head for a rotary head drum to which the present invention is applied.

In the present third embodiment, the magnetic head according to the first embodiment is modified such that a lower portion of the lower side groove 15 is open at an open portion 16 thereof by cutting away the lower side tape sliding surface 12c in such a manner that the tape sliding surface 12 is divided into two portions including the central tape sliding surface 12a and the upper side tape sliding surface 12b.

Where the lower portion of the lower side groove 15 is open at the open portion 16 in this manner, the spacing between the central tape sliding surface 12a of the tape sliding surface 12, on which the magnetic gap 13 is provided, and the magnetic tape 21 can be further reduced. Consequently, a sufficiently high head output can be secured further readily.

Figure 7:
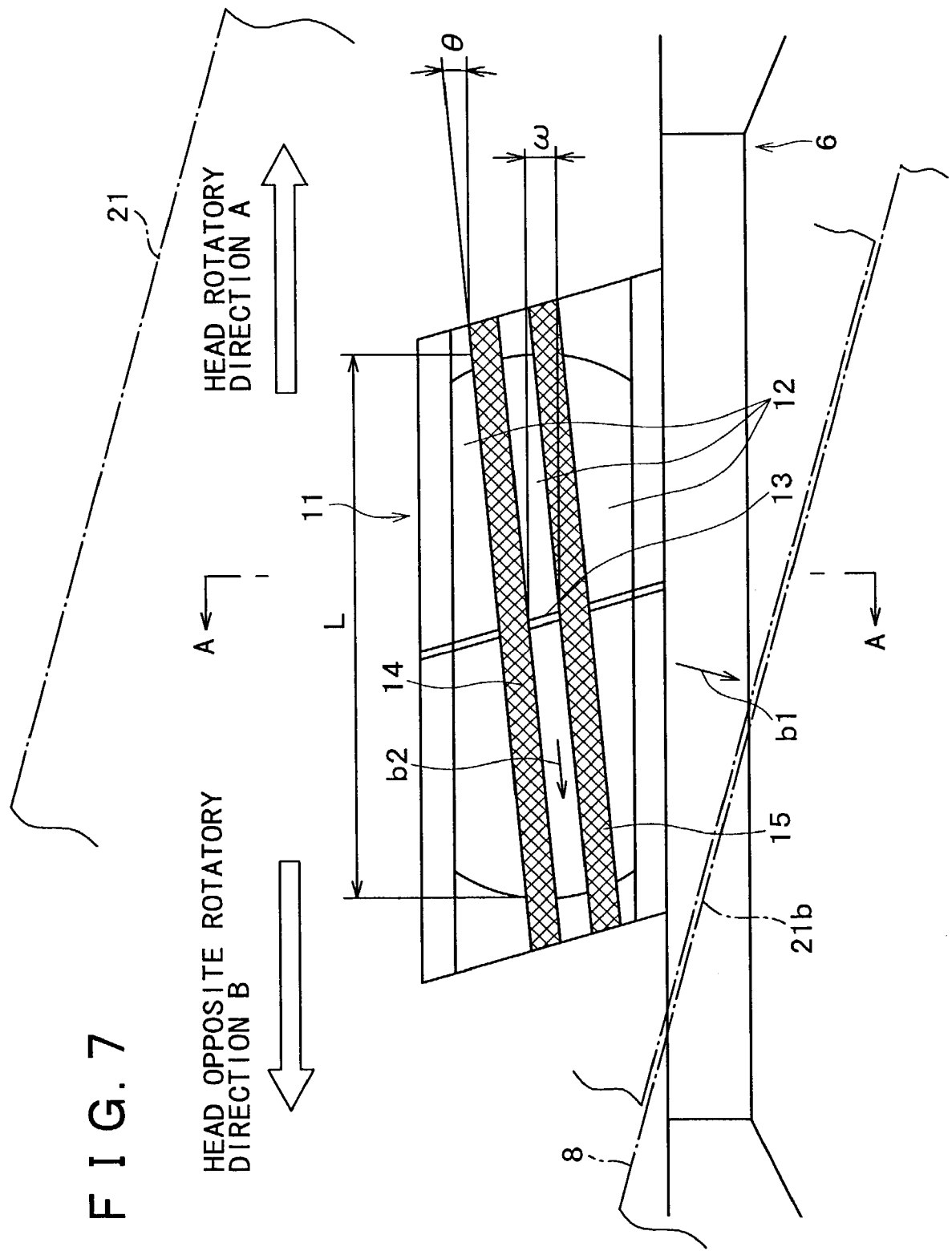
FIG. 7 is a schematic side elevational sectional view of a head chip of a still further rotating magnetic head for a rotary head drum to which the present invention is applied.
Figure 8:
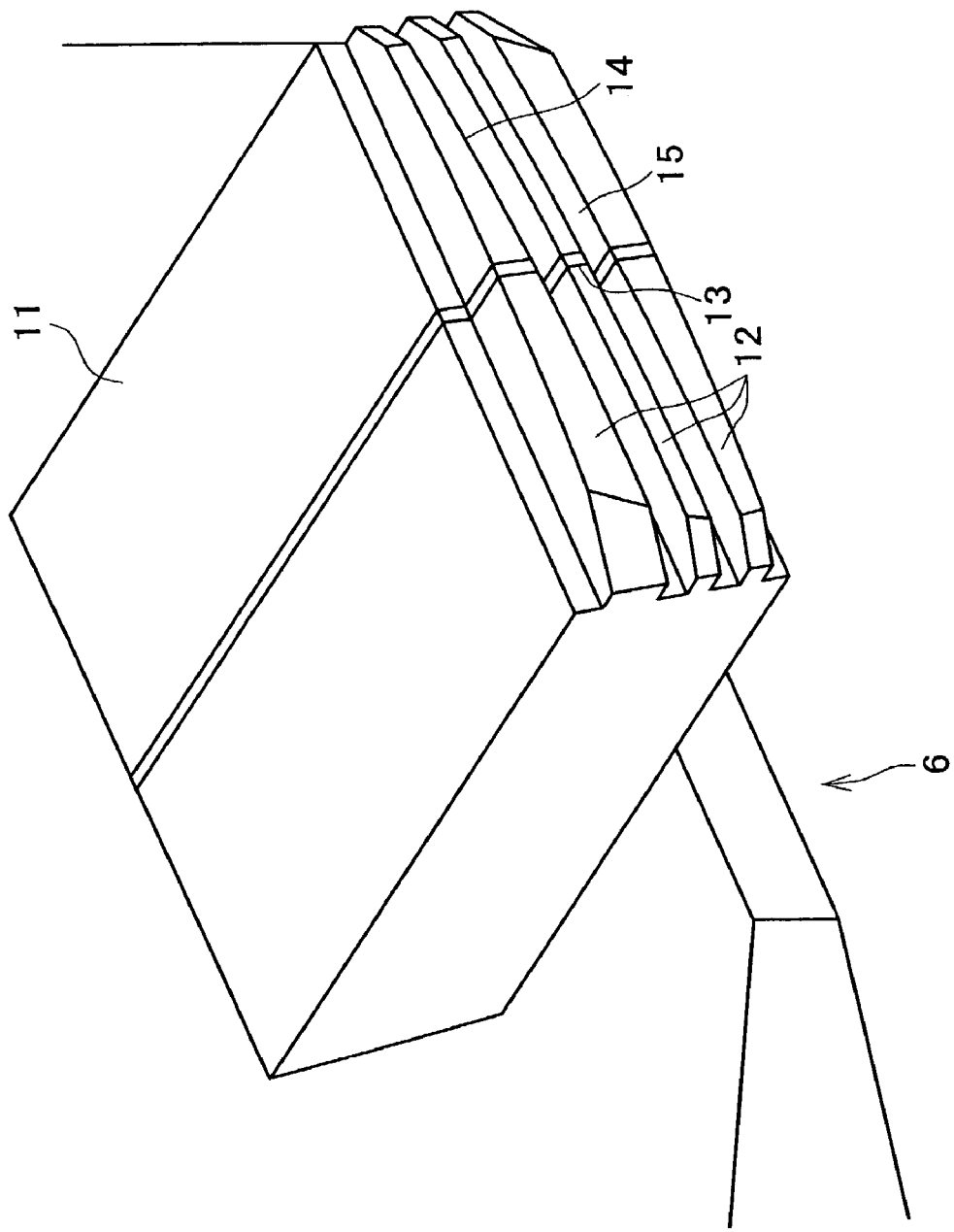
FIG. 8 is a perspective view of a head chip of the magnetic head of FIG. 7.
Figure 9:
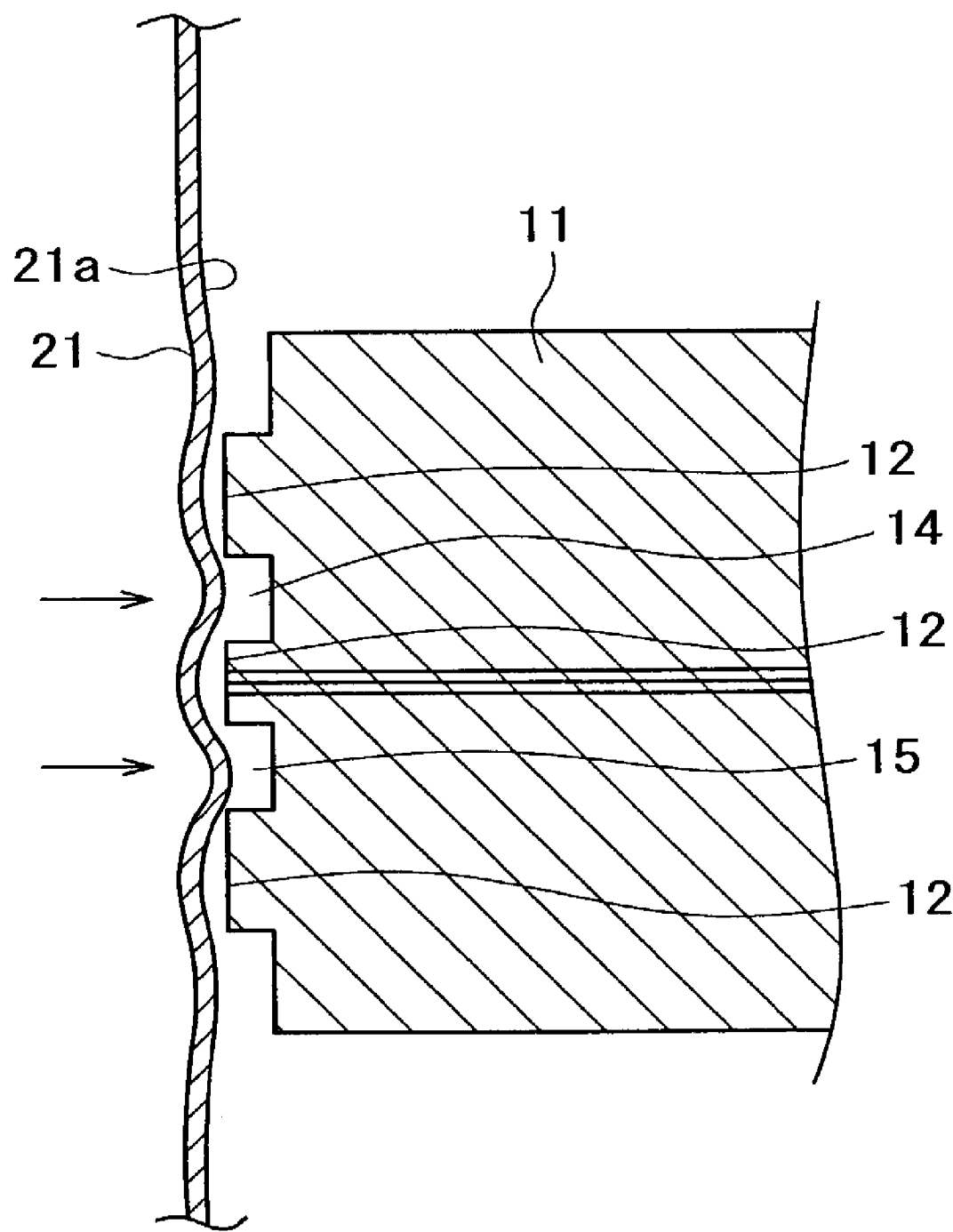
FIG. 9 is a sectional view taken along line A—A of FIG. 7.

Referring now to FIGS. 7 to 9, there is shown a still further magnetic head for a rotary head drum to which the present invention is applied. A head chip 11 of the magnetic head according to the present fourth embodiment is configured such that a pair of upper and lower grooves 14 and 15 for allowing air to escape therethrough are formed in parallel to each other on the opposite upper and lower sides of a magnetic gap 13 formed at a substantially center of a tape sliding surface 12 of the head chip 11 but in an inclined relationship by an angle of elevation of a predetermined inclination angle θ with respect to a rotatory direction A of the head chip 11.

Where the sliding width of the magnetic gap 13 on the magnetic tape 21 is w while the length of the tape sliding surface 12 is L and the length of the pair of grooves 14 and 15 is L, the grooves 14 and 15 are preferably formed such that they satisfy $$\theta \geq w/(L/2) \quad (1)$$

The inclination angle θ is preferably within 10° and most preferably approximately 4° to 6°.

With the head chip 11 of the rotating magnetic head 6 having such a configuration as described above, when the magnetic gap 13 of the head chip 11 helically scans the signal recording surface 21a of the magnetic tape 21 at a high speed along the rotatory direction A, such an air escaping action occurs that air between the tape sliding surface 12 of the head chip 11 and the magnetic tape 21 escapes at a high speed in an obliquely downward direction b2 of an opposite direction B on the trailing side of the rotatory direction A along and through the pair of upper and lower grooves 14 and 15. Consequently, the magnetic tape 21 is contacted with the tape sliding surface 12 of the head chip 11 (actually an air film on the submicron order is generated between the magnetic tape 21 and the tape sliding surface 12) so that recording or reproduction of data onto or from the signal recording surface 21a of the magnetic tape 21 is performed by the magnetic gap 13.

In this instance, if a foreign substance 31 such as a magnetic particle sticking to the signal recording surface 21a of the magnetic tape 21 is transferred to the tape sliding surface 12 of the head chip 11 on the leading side in the rotatory direction A, then the foreign substance 31 such as a magnetic particle is carried in the opposite rotatory direction B by rotation of the head chip 11 and is likely to be accumulated in the head chip 11.

Figure 10:
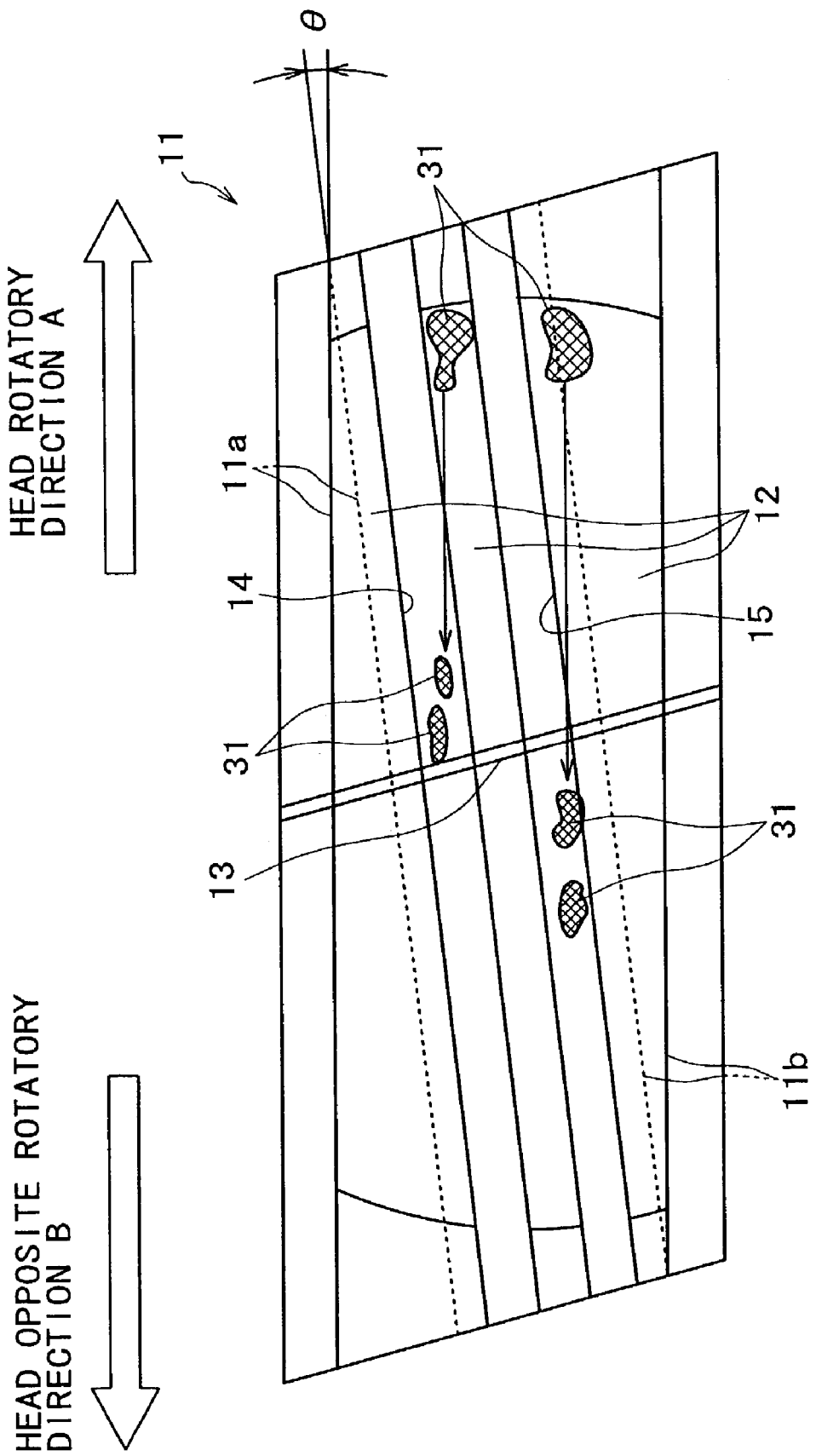
FIG. 10 is an enlarged front elevational view illustrating admission of a foreign substance such as a magnetic particle transferred to a tape sliding surface of the magnetic head of FIG. 7 into a groove of the head chip.

However, since the pair of upper and lower grooves 14 and 15 extending in parallel to each other on the opposite upper and lower sides of the magnetic gap 13 are inclined at an angle of elevation of the inclination angle θ with respect to the rotatory direction A as seen in FIGS. 7 to 9, a foreign substance 31 such as a magnetic particle transferred from the magnetic tape 21 to the tape sliding surface 12 between the pair of upper and lower grooves 14 and 15 on the leading side in the rotatory direction A of the magnetic gap 13 is admitted into the upper side groove 14 intermediately while it is carried in the opposite rotatory direction B toward the magnetic gap 13 side on the tape sliding surface 12 as the head chip 11 rotates in the rotatory direction A, as shown in FIG. 10. Consequently, the foreign substance 31 such as a magnetic particle is prevented from arriving at and being accumulated in the magnetic gap 13.

Meanwhile, as shown in FIG. 10, a foreign substance 31 such as a magnetic particle transferred from the magnetic tape 21 to a position of the tape sliding surface 12 lower than the lower side groove 15 on the leading side of the magnetic gap 13 in the rotatory direction A is admitted into the lower side groove 15 while it is carried in the opposite rotatory direction B on the tape sliding surface 12 as the head chip 11 rotates in the rotatory direction A. Consequently, also the foreign substance 31 can be prevented from arriving at and being accumulated in the magnetic gap 13.

Accordingly, with the head chip 11 having such a configuration as described above, a foreign substance 31 such as a magnetic particle transferred from the magnetic tape 21 to the tape sliding surface 12 can be prevented from arriving at and being accumulated in the magnetic gap 13 and giving rise to the spacing loss, and consequently, recording or reproduction of a signal onto or from the magnetic tape 21 can be performed normally with a high degree of accuracy (at a high density).

Further, it has been confirmed through an experiment that, where the inclination angle θ of the pair of upper and lower grooves 14 and 15 with respect to the rotatory direction A is set to 4° to 6°, stability in feeding of the magnetic tape 21 in the opposite rotatory direction B with respect to the head chip 11 can be achieved while prevention of a foreign substance 31 such as a magnetic particle into the magnetic gap 13 is achieved.

Figure 12:
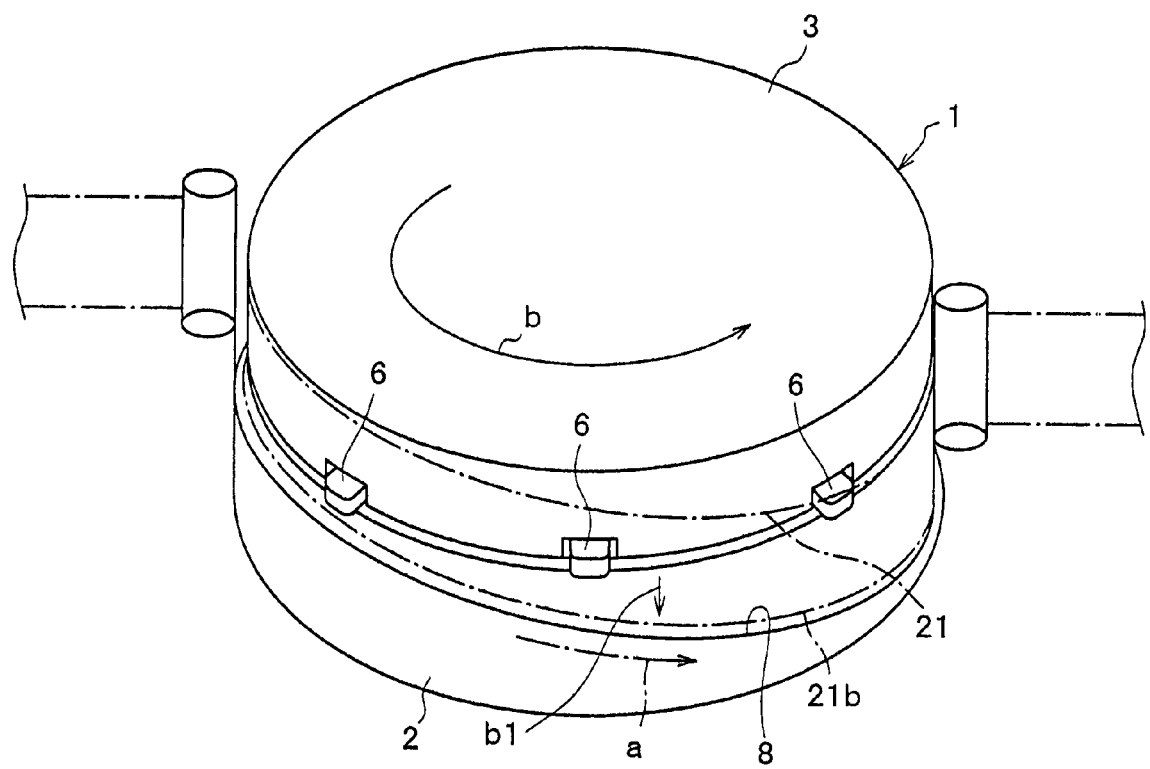
FIG. 12 is a perspective view of an entire rotary head drum.
Figure 1:
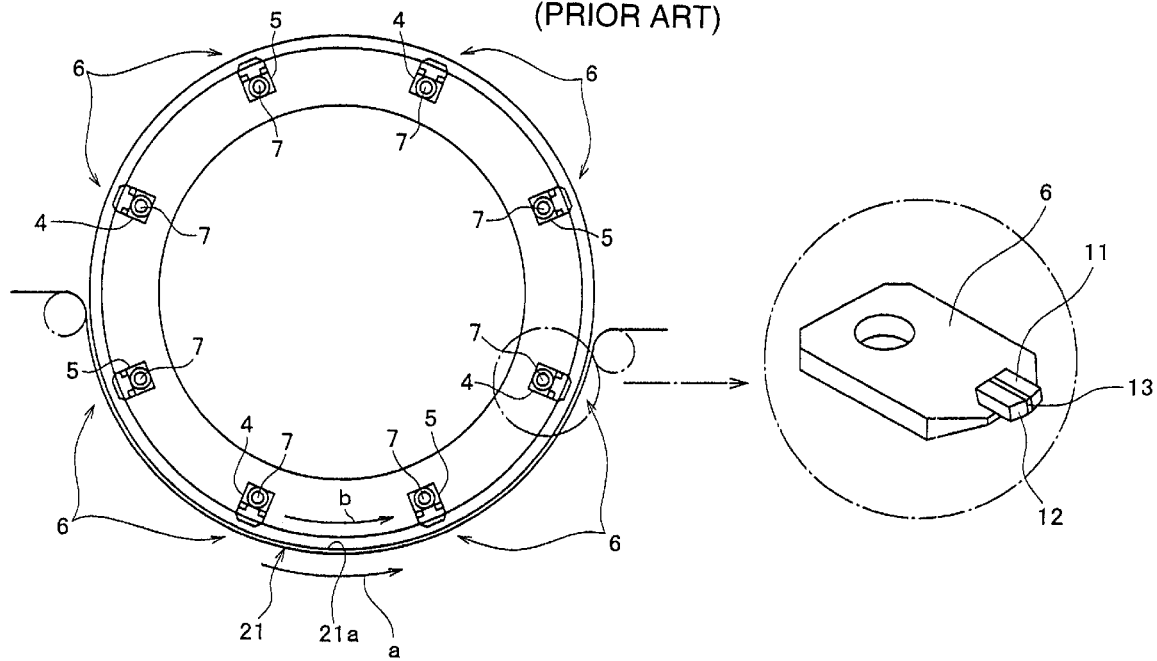
Figure 14:
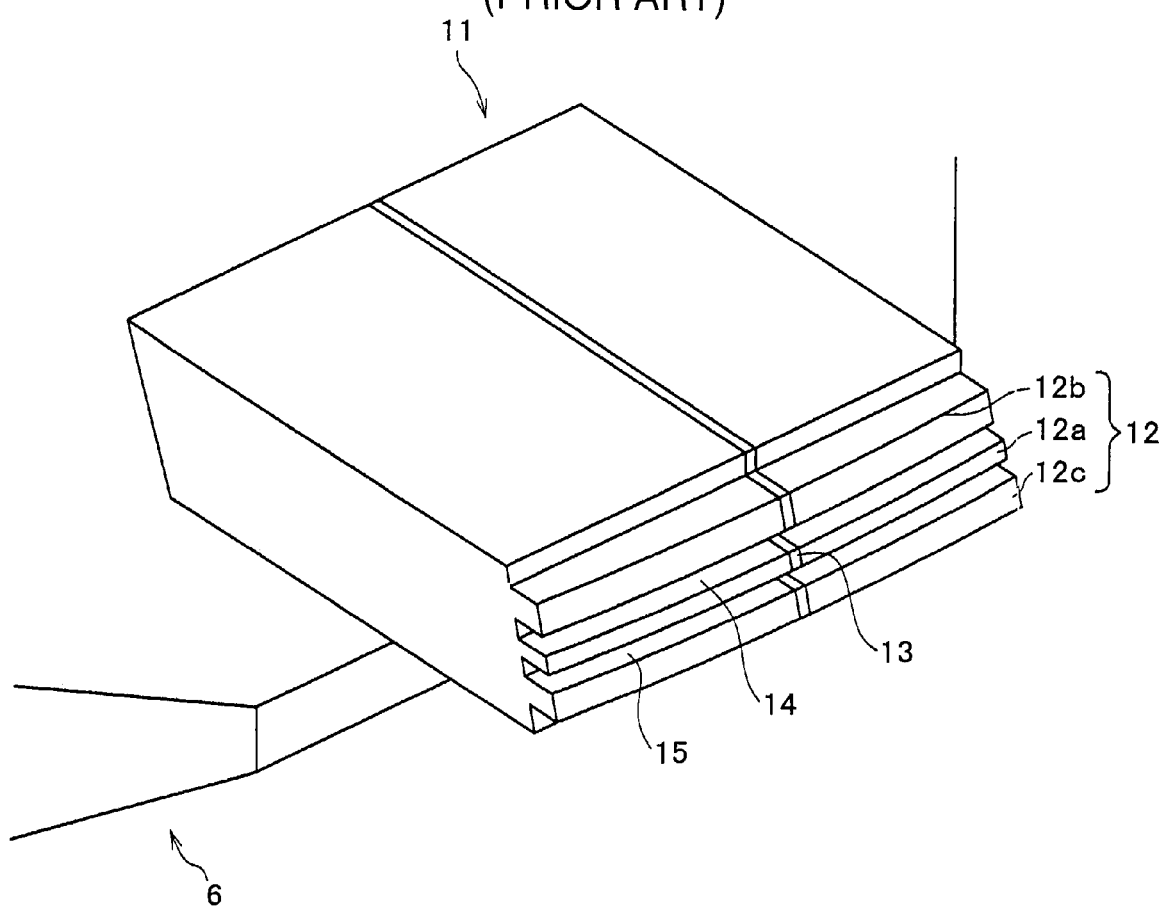
FIG. 14 is a perspective view of a conventional head chip which has a small head contacting width.

Further, where the pair of upper and lower grooves 14 and 15 are inclined at an angle of elevation with respect to the rotatory direction A in this manner, when air escapes at a high speed in the obliquely downward direction b2 of the opposite rotatory direction B within and through the upper and lower grooves 14 and 15, pushing down force in a downward direction b1 acts upon the magnetic tape 21 and tends to press the lower edge 21b of the magnetic tape 21 against the helical tape lead 8 of the fixed drum 2 of the rotary head drum 1 as seen in FIGS. 7 and 12. Consequently, also an advantage that the magnetic tape 21 can be helically fed stably can be anticipated.

Figure 11:
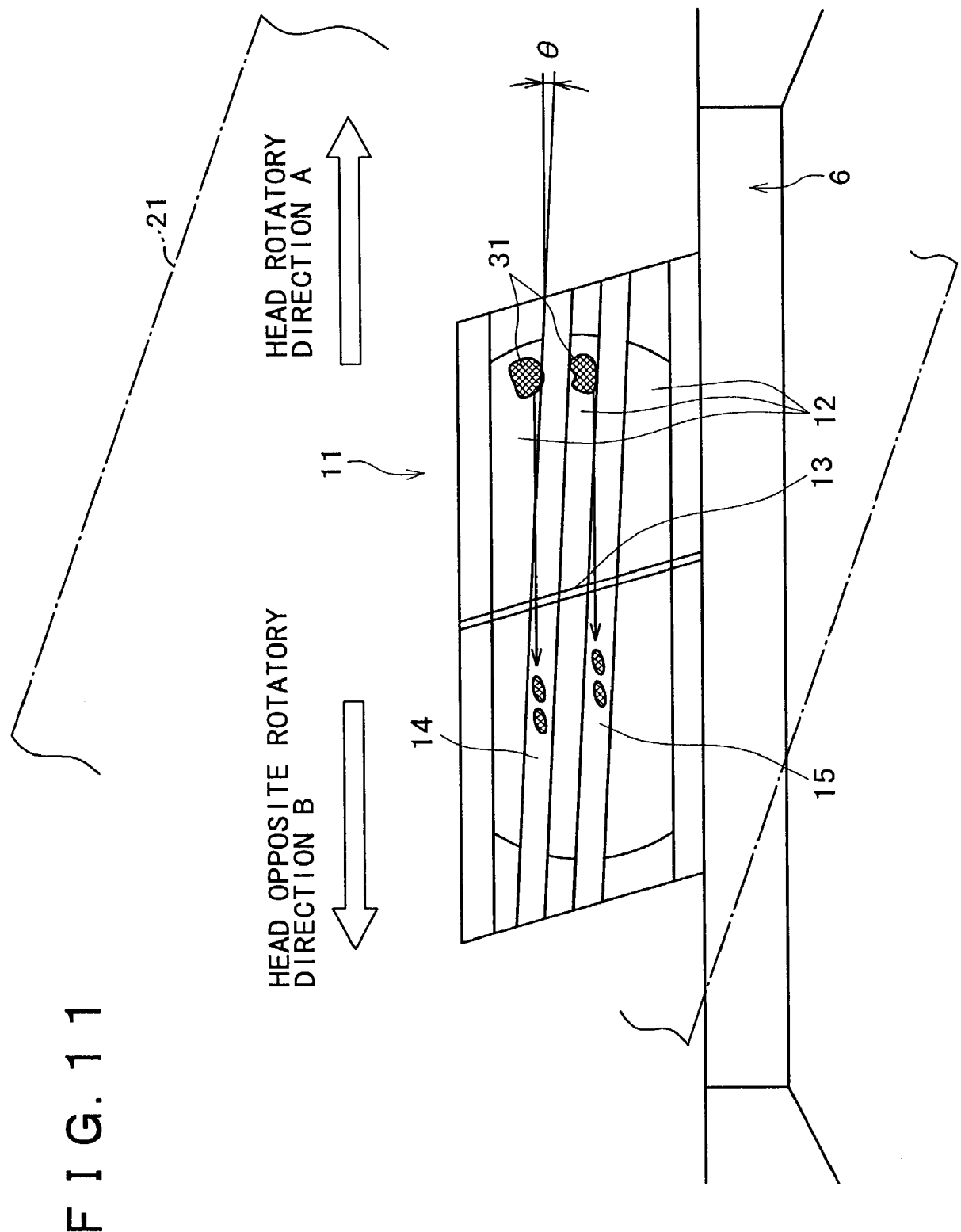
FIG. 11 is a schematic side elevational sectional view of a head chip of a yet further rotating magnetic head for a rotary head drum to which the present invention is applied.

Referring now to FIG. 11, there is shown a yet further rotating magnetic head for a rotary head drum to which the present invention is applied. A head chip 11 of the rotating magnetic head according to the present fifth embodiment is generally configured such that a pair of upper and lower parallel grooves 14 and 15 are inclined at a depression angle of a predetermined angle θ with respect to a rotatory direction A of the head chip 11.

With the head chip 11 shown in FIG. 11, a foreign substance 31 such as a magnetic particle transferred from the magnetic tape 21 to the tape sliding surface 12 between the pair of upper and lower grooves 14 and 15 on the leading side in the rotatory direction A of the magnetic gap 13 is admitted into the lower side groove 15 intermediately while it is carried in the opposite rotatory direction B toward the magnetic gap 13 side on the tape sliding surface 12 as the head chip 11 rotates in the rotatory direction A. Consequently, the foreign substance 31 such as a magnetic particle can be prevented from arriving at and being accumulated in the magnetic gap 13.

Meanwhile, a foreign substance 31 such as a magnetic particle transferred from the magnetic tape 21 to a position of the tape sliding surface 12 higher than the upper side groove 14 on the leading side of the magnetic gap 13 in the rotatory direction A is admitted into the upper side groove 14 while it is carried in the opposite rotatory direction B on the tape sliding surface 12 as the head chip 11 rotates in the rotatory direction A. Consequently, also the foreign substance 31 can be prevented from arriving at and being accumulated in the magnetic gap 13.

It is to be noted that, as shown in FIG. 10, the opposite upper and lower faces 11a and 11b at the tip end of the head chip 11 connected to the tape sliding surface 12 may be formed in parallel to the rotatory direction A of the head chip 11 as indicated by solid lines in FIG. 11 or may otherwise be formed in parallel to the upper and lower grooves 14 and 15 inclined by the inclination angle θ with respect to the rotatory direction A of the head chip 11 as indicated by broken lines in FIG. 10.

While several embodiments of the present invention have been described above, the present invention is not limited to the embodiments described above but allows various modifications based on the technical scope thereof.

For example, in the embodiments described above, since the head chip 11 helically scans the magnetic tape 21 in an obliquely upward direction from the lower edge 21b toward the upper edge 21c of the magnetic tape 21, that one of the upper side tape sliding surface 12b and the lower side tape sliding surface 12c which is brought into contact with the magnetic tape 21 earlier than the central tape sliding surface 12a is the upper side tape sliding surface 12b. However, in another system wherein the head chip 11 helically scans the magnetic tape 21 in an obliquely downward direction from the upper edge 21c toward the lower edge 21b of the magnetic tape 21, that one of the upper side tape sliding surface 12b and the lower side tape sliding surface 12c which is brought into contact with the magnetic tape 21 earlier than the central tape sliding surface 21a is the lower side tape sliding surface 12c.

Accordingly, the rotating magnetic head 6 of the present invention may have a structure inverted from any of those shown in FIGS. 1 to 6.

What is claimed is:

1. A magnetic head for a rotary head drum, comprising:
a head chip having a tape sliding surface at an end thereof and having a magnetic gap formed on said tape sliding surface, said tape sliding surface having a pair of grooves formed along the opposite sides of said magnetic gap in such a manner that said tape sliding surface is divided into three tape sliding surfaces including a belt-like central tape sliding surface on which said magnetic gap is formed and a belt-like upper side tape sliding surface and a belt-like lower side tape sliding surface formed on the opposite upper and lower sides of said central tape sliding surface with said pair of grooves left therebetween,
a first one of said upper side tape sliding surface and said lower side tape sliding surface which is brought into contact with a magnetic tape earlier than said central tape sliding surface being formed with an increased thickness,
a second one of said upper side tape sliding surface and said lower side tape sliding surface which is brought into contact with the magnetic tape later than said central tape sliding surface being formed with a decreased thickness.

2. A magnetic head for a rotary head drum, comprising:
a head chip having a tape sliding surface at an end thereof and having a magnetic gap formed on said tape sliding surface, said tape sliding surface having a pair of grooves formed along the opposite sides of said magnetic gap in such a manner that said tape sliding surface is divided into three tape sliding surfaces including a belt-like central tape sliding surface on which said magnetic gap is formed and a belt-like upper side tape sliding surface and a belt-like lower side tape sliding surface formed on the opposite upper and lower sides of said central tape sliding surface with said pair of grooves left therebetween,
a first one of said upper side tape sliding surface and said lower side tape sliding surface which is brought into contact with a magnetic tape earlier than said central tape sliding surface being formed with an increased thickness,
a second one of said upper side tape sliding surface and said lower side tape sliding surface which is brought into contact with the magnetic tape earlier than said central tape sliding surface being formed with a decreased thickness,
that one of said grooves which is positioned between said central tape sliding surface and the first tape sliding surface being formed with a thickness greater than that of the other groove which is positioned between said central tape sliding surface and the second tape sliding surface.

3. A magnetic head for a rotary head drum, comprising:
a head chip having a tape sliding surface at an end thereof and having a magnetic gap formed on said tape sliding surface, said tape sliding surface having a groove formed along an upper side or a lower side of said magnetic gap in such a manner that said tape sliding surface is divided into two tape sliding surfaces including a belt-like central tape sliding surface on which said magnetic gap is formed and a belt-like upper side tape sliding surface or a belt-like lower side tape sliding surface formed on the upper side or the lower side of said central tape sliding surface with said groove left therebetween,
said upper side tape sliding surface or said lower side tape sliding surface which is brought into contact with a magnetic tape earlier than said central tape sliding surface being formed with a thickness greater than that of said central tape sliding surface,
a portion of said head chip on the opposite side to said upper side tape sliding surface or said lower side tape sliding surface with respect to said central tape sliding surface being open at an open portion parallel to said groove.

* * * * *